Patented Sept. 22, 1936

2,054,889

UNITED STATES PATENT OFFICE 2,054,889

METAL CATALYST BASE

William Sieck, Jr., Hubbard Woods, Ill.

No Drawing. Application April 29, 1933,
Serial No. 668,617

2 Claims. (Cl. 204—9)

This invention relates in general to a metal catalyst base and method of producing the same, and one of the objects of the invention is to produce a flocculent, friable and voluminous product composed of a mixture of a metal hydroxide and an inert carrier, in which the original structure of the inert carrier will be maintained.

In carrying out certain chemical reactions with the aid of metal catalysts it has been found that, as a rule, those catalysts in which the metal is supported on some inert substance, such as kieselguhr, will show a greater activity than those in which the metal simply exists in a fine state of subdivision.

Heretofore, the production of such supported catalysts for the hydrogenation of oils has usually been carried out somewhat in the following manner.

To a solution of nickel sulphate in water a quantity of kieselguhr has been added and well mixed. To this mixture was then added a solution of sodium hydroxide producing sodium sulphate in solution and an insoluble precipitate of nickel hydroxide intimately mixed with the kieselguhr.

The precipitate thus obtained was then washed with water, and as much of the sodium sulphate as practically possible removed by this means. The washed precipitate was then dried and ground or pulverized, and the resulting catalyst base was then reduced in hydrogen gas at a temperature of 650° to 750° F., to produce the finished catalyzer.

In order to keep the tanks in which the precipitation was carried out down to a reasonable size, the concentration of the original nickel sulphate solution could not be less than about five per cent, with the result that the precipitate which was formed was dense in structure and not as flocculent and extended as desired, and when dried and ground a comparatively dense vitreous powder was obtained.

Furthermore, it was found that such a dried and ground catalyst base, in most cases, still contained traces of sodium sulphate which had not been removed in the washing, due to part of the sodium sulphate being occluded by the dense precipitate and therefore not accessible to the wash water. Such traces of sodium sulphate very materially decreased the activity of the finished catalyst.

It is one of the objects of the present invention to provide a metal catalyst base by electrochemical solution and precipitation of a metal in an electrolyte carrying in suspension a carrier, such as kieselguhr or other suitable inert material.

In carrying this invention in operation, and as illustrating one adaptation thereof, a nickel anode is suspended in an electrolyte consisting of a solution of sodium acetate in which is carried in suspension a suitable quantity of kieselguhr. The cathode of the cell may also be of nickel, or of any other conductor of electricity which will not be attacked by the electrolyte.

If such a cell is connected with a source of direct current electricity, nickel will be dissolved from the anode to form nickel acetate, and sodium hydroxide will be formed at the cathode. These two products of electrolysis will react with each other to form nickel hydroxide and sodium acetate, the nickel hydroxide appearing as an insoluble precipitate and the sodium acetate remaining in solution, thus regenerating the electrolyte.

Due to the fact that the particles of nickel hydroxide in such a cell are formed under conditions of very low concentrations of the reacting chemical agents, and at the same time are continuously attaching themselves to the particles of kieselguhr in suspension in the electrolyte, a very voluminous and flocculent precipitate is formed.

When the precipitate thus produced is dried, a friable and light powder is obtained, with a density of less than one-half of the density of such powders as obtained by the usual methods heretofore in use.

When viewed under the microscope, it is found that in the metal catalyst base, as produced by this improved method, the original skeletal structure of kieselguhr is retained, each individual particle of the kieselguhr having attached to it minute particles of the nickel hydroxide, whereas in the catalyst base as produced by the methods heretofore employed, the inert material appears to be cemented together into comparatively large amorphous masses with the nickel hydroxide.

With the present invention, therefore, a catalyst base will be produced, in which the metal exists in a greatly extended form with a relatively large surface, and comparative tests of the finished catalyzers, when used for oil hydrogenation, have shown that catalyzer made from the base produced by means of this invention is more active than catalyzers produced by methods heretofore employed.

With this improved electrolytic method it is possible to produce catalyst bases composed of a mixture of hydroxide of two or more metals, if anodes of several different metals are used in the electrolytic cell and are connected with a source of electricity at the same time.

While the preferred method of producing this improved metal catalyst base has been herein described, it is to be understood that various changes may be made in the steps of the operation and of the carrier employed, within the scope of the claims, without departing from the spirit of this invention.

What is claimed as new is:—

1. The process of producing a catalyst base consisting of nickel hydroxide precipitated in the presence of a carrier, wherein the nickel hydroxide is produced by electrolysis, employing an electrolyte of sodium acetate, and an anode of nickel.

2. The process of producing a catalyst base consisting of several metal hydroxides precipitated in the presence of a carrier, wherein the metal hydroxides are produced by electrolysis, employing an electrolyte of sodium acetate, and several anodes of the same metal as the metal hydroxides which are to be produced.

WILLIAM SIECK, Jr.